April 15, 1947.  H. GOLDBERG ET AL  2,418,875

NON-LINEAR CHARGING SYSTEM FOR NETWORKS

Filed June 29, 1945

INVENTOR.
HAROLD GOLDBERG
EDWARD E. DEMERS
BY
D. Clyde Jones
ATTORNEY

Patented Apr. 15, 1947

2,418,875

UNITED STATES PATENT OFFICE 2,418,875

NONLINEAR CHARGING SYSTEM FOR NETWORKS

Harold Goldberg, Baltimore, Md., and Edward F. De Mers, Rochester, N. Y., assignors to Stromberg-Carlson Company, Rochester, N. Y., a corporation of New York Application June 29, 1945, Serial No. 602,257

2 Claims. (Cl. 171—97)

This invention relates to a non-linear charging system for networks.

In connection with various pulse controlled devices, it is necessary to generate pulses by electrically charging and discharging a network. The discharging of the network, in many instances, is governed by an electronic switch, preferably closed at a given frequency, under the control of trigger pulses applied at a given repetitive rate. If the frequency of closure of the electronic switch is not constant, the output pulse voltage will vary as a function of the closure frequency. Such variation has prevented the use of this type of pulser network for pulse modulation systems and the like.

The main feature of the invention relates to a charging system for networks in which the output pulse voltage is independent, within certain limits, of the rate of switch closure.

Another feature of the present invention relates to a network charging system in which the inductance device included therein is equally efficient but physically smaller than equivalent inductance devices in former systems.

These features as well as the advantages of the invention will appear from the detailed description and claims when taken with the drawings in which:

Figure 1:
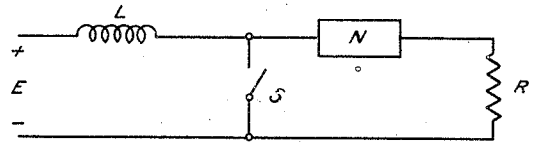
Fig. 1 is a diagrammatic showing of a nonlinear charging system and pulse generating network in accordance with the present invention.
Figure 7:
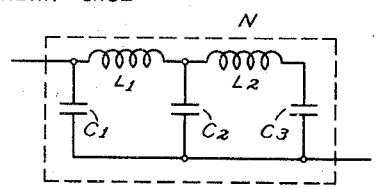
Fig. 7 illustrates one type of network which can be charged from the system.

In the charging system of Fig. 1, there is provided a direct current source of voltage E of the polarity shown. The positive terminal of this source is connected through a non-linear, ferromagnetic-cored, inductance device L, to one terminal of the network N. The other terminal of the source is connected to the other terminal of the network. The load R may be connected in the system as shown or may be connected thereto through a pulse transformer in the manner indicated in the application of Goldberg and De Mers, Serial No. 521,462, filed February 7, 1944. In the present system, there is provided a switch S in a connection across the network N and the load R. This switch which is opened and closed periodically, in actual practice may take the form of a triggered gap or Thyratron similar to that disclosed in the mentioned application. The network N is a pulse forming network which may comprise the inductance coils $L_1$ and $L_2$ and the condensers $C_1$, $C_2$ and $C_3$, as indicated in Fig. 7. At low frequencies, corresponding to the frequency of discharge of this network, it acts as a two-terminal network which is essentially a capacitance herein referred to as C.

In the operation of the network let it be assumed that the capacitance C, comprising the condensers $C_1$, $C_2$ and $C_3$, is initially discharged through the resistor or load R as a result of the closing of switch S. When this switch is opened, the network N will be charged through ferrous-cored inductance unit or device L, by the source E. Where the inductance of the unit L is linear, if the frequency of closure of switch S is $F_r$, and the natural frequency of inductance unit L and capacitance C is made to be equal to $F_r/2$, the network will charge to approximately the voltage 2E in the interval between closures of switch S. When the voltage reaches the value 2E, switch S closes, and the network N discharges completely through resistor R thereby developing a pulse voltage across the resistor R. The inductance unit L prevents a large current from flowing through switch S from source E during the discharge period which is of the order of microseconds. Switch S opens in a very short time after the network has discharged to develop the pulse. Since the charging interval, while switch S is open, is of the order of hundreds or thousands of micro-seconds, the network acts practically as a pure capacitance during the charging period. An inductance device L is used for charging the network N to raise the efficiency of charge. A condenser charged through a resistor is charged at a theoretical efficiency of 50%, while a condenser may be charged through an inductance unit with a theoretical efficiency of 100%. This is characterized by the fact that a source of voltage E charges the condenser to a voltage E when the charging takes place through a resistor, but charges it to a voltage 2E when charging with 100% efficiency through an inductance unit.

As a matter of fact, if the closure of switch S is periodic, the inductance unit L may have any value larger than that necessary to make the natural frequency of L and C equal to $F_r/2$. In every case, the network N will still charge to approximately 2E providing this network is completely discharged at each closure. Even if the network is not completely discharged at each switch closure, the charging is still 100% efficient, theoretically, but the voltage to which the network charges is no longer 2E. If inductance unit L has such a value, however, that the natural frequency of L and C is less than or equal to $F_r/2$, the charging is theoretically 100% efficient and the output pulse voltage across the resistor R is approximately E.

Figure 2:
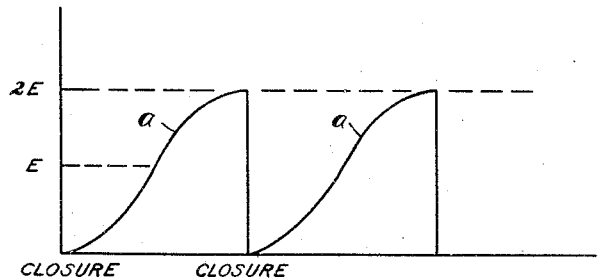
Fig. 2 is a curve of the charging voltage of the network with respect to time in a conventional system.

In the past, great care has been taken to insure linear performance in the inductance unit L. In construction the inductance coil has usually been provided with an iron-core and precautions have been taken to keep the inductance constant over the range of current encountered in any given application. Generally, it is desirable to keep the inductance unit L as small as possible and it is usually made, so that the natural frequency of L and C is $F_r/2$. It should be pointed out that if the closure frequency of switch S is not constant, the output pulse voltage will vary as a function of the closure frequency. This is generally undesirable, since it prevents the use of this pulser circuit for pulse modulation systems. The curve of charging voltage of network N through a linear inductance unit with respect to time, is designated $a$ in Fig. 2, this curve comprising segments of a sine wave. The equation for this curve is $$E_c = E(1-\cos \omega t)$$

where $o = \omega t$; where $\omega = 2\pi f$; $f$ = the repetitive rate; and $t$ = time.

In accordance with the present invention, the inductance unit L is made non-linear, which may be defined quantitatively as a unit for which the inductance decreases 15% or more during a charging cycle. Normally it is assumed that there is a linear proportionality between B (flux density) and H (magnetic intensity applied to the ferromagnetic material), namely that $B = \mu H$ where $\mu$ is treated as a constant. Actually $$B = \mu H + C(H)$$

where $C(H)$ is a correction term which varies as H varies. In particular one may write $$B = \mu H - \mu_3 H^3 + \mu_5 H^5$$

Figure 3:
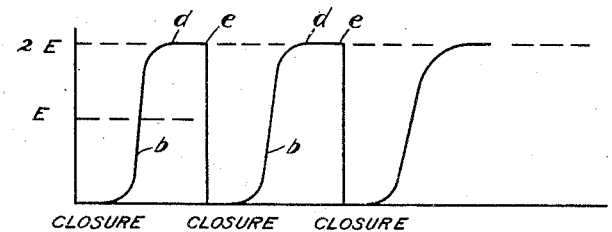
Fig. 3 is a similar curve of charging voltage with respect to time of the network of the present invention.

(Note that for small values of H, $H^3$ is very much less than H etc. so that for small values of H, the correction $C(H)$ is small and generally is neglected). When, however, $C(H)$ is important to the particular operation of a device, then the core material is said to be operated in non-linear fashion. Under these conditions a coil wound on such a core is said to be a non-linear inductance. If the unit has a non-linear inductance (the inductance is a function of the current flowing through the unit) the charge of network N will still be 100% efficient, the output pulse voltage will still be approximately E, but the inductance unit will in general be physically smaller than the equivalent linear inductance unit and the output pulse voltage is now independent, within limits, of the rate of closure. The pulse circuit, using a non-linear inductance L can therefore be used in pulse modulation systems. The inductance unit must be designed so that it saturates heavily during the charging cycle. The charging curve of voltage on network N is shown at $b$ in Fig. 3. It will be seen that this curve departs materially from segments of a sine wave in the direction of segments of a rectangular wave.

Figure 4:
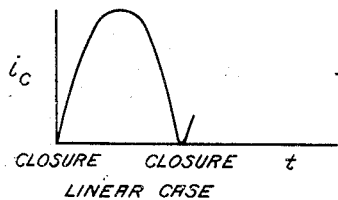
Figs. 4 and 5 illustrate the charging current in relation to time where a linear and a non-linear inductance are respectively used in the charging system.
Figure 5:
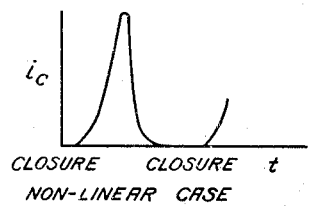
Figure 6:
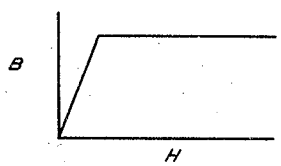
Fig. 6 shows a theoretically desirable BH curve for the core material of the inductance device.

It will be noted from curve $b$, that the change in voltage with time is very slow at the beginning and at the end of the charge. This factor allows the charging period to change appreciably over a range such as in curve $b$, from $d$ to $e$, without resulting in a large change in final voltage. This may be explained from the fact that at the beginning of the charging period, the charging current is small and the inductance is large. The natural period of L and C is long and the voltage rises slowly. As the current builds up, the inductance decreases, the natural period decreases, and the voltage builds up at an increasingly faster rate. When the current is large enough to saturate the inductance unit, the natural period becomes very short because the inductance is very low, and the voltage rises with great rapidity. The current reaches a maximum when the voltage is E. After the voltage has risen beyond the value E, the current decreases, the inductance thereupon increases, and the rate of rise of voltage decreases. Almost all of the charging takes place while the inductance unit is saturated and as a result the slope of the charging curve at the beginning and end of the cycle is very small. The effect is most pronounced when the core material of the inductance unit has a BH curve with a very sharp knee. The curve $e$ (Fig. 4) and curve $f$ (Fig. 5) show the charging current for a network first with a linear unit and then with a non-linear unit respectively. Curve $g$ of Fig. 6 shows a theoretically desirable BH curve for the core material of the inductance unit. The initial permeability of this core material should be as high as possible. The reduction in size of the present inductance unit over the equivalent linear inductance unit comes about in the following manner. The linear inductance unit is made by introducing an air gap into the core of this unit. Thus, the final inductance is much lower than that obtained with the same core but without the air gap. In the non-linear case, the low current inductance very largely determines the length of the charging cycle. Therefore, for a given inductance and a given core, the inductance unit without the gap may be used at a lower repetition rate than that with the gap. Consequently, for the same repetition rate, the non-linear inductance unit requires less iron in its core and less copper in its coil than the linear inductance unit.

What we claim is:

1. In an arrangement for delivering electrical pulses, a network which acts essentially as a capacitance at a given frequency of the discharge thereof, a voltage source, a circuit including a non-linear inductance device through which said network is charged from said source, said device comprising a coil wound on a ferromagnetic core, the relation between flux density and the magnetic intensity applied to the ferromagnetic core deviating from a linear proportionality by a substantial correction factor, a load unit, and means for discharging said network into said load unit.

2. In an arrangement for delivering electrical pulses, a network which acts essentially as a capacitance at a given frequency of the discharge thereof, a voltage source, a circuit including a non-linear inductance device through which said network is charged from said source, the inductance of said device decreasing at least 15% during the charging cycle, a load unit, and means for discharging said network into said local unit.

HAROLD GOLDBERG.
EDWARD F. DE MERS.

REFERENCES CITED

The following references are of record in the file of this patent:

UNITED STATES PATENTS

| Number | Name | Date |
|---|---|---|
| 2,394,389 | Lord | Feb. 5, 1946 |